US009605229B2

(12) United States Patent
Leblanc et al.

(10) Patent No.: US 9,605,229 B2
(45) Date of Patent: Mar. 28, 2017

(54) LUBRICANT FOR LAMINATION OF LITHIUM SHEETS INTO LITHIUM THIN FILMS

(71) Applicant: Bathium Canada Inc., Boucherville (CA)

(72) Inventors: Patrick Leblanc, Boucherville (CA); Frederic Cotton, Montreal (CA); Pierre Sirois, St-Hubert (CA)

(73) Assignee: Bathium Canada Inc., Boucherville (CA)

( * ) Notice: Subject to any disclaimer, the term of this patent is extended or adjusted under 35 U.S.C. 154(b) by 0 days.

(21) Appl. No.: 14/576,429

(22) Filed: Dec. 19, 2014

(65) Prior Publication Data

US 2016/0177210 A1 Jun. 23, 2016

(51) Int. Cl.

| C10M 105/76 | (2006.01) |
|---|---|
| B21B 27/10 | (2006.01) |
| B21B 3/00 | (2006.01) |
| H01M 4/04 | (2006.01) |
| H01M 4/1395 | (2010.01) |
| H01M 4/38 | (2006.01) |
| H01M 4/40 | (2006.01) |
| B21B 45/02 | (2006.01) |
| H01M 4/02 | (2006.01) |

(52) U.S. Cl.
CPC ....... *C10M 105/76* (2013.01); *B21B 45/0242* (2013.01); *H01M 4/0435* (2013.01); *H01M 4/1395* (2013.01); *H01M 4/382* (2013.01); *H01M 4/405* (2013.01); *B21B 3/00* (2013.01); *B21B 27/10* (2013.01); *C10M 2227/045* (2013.01); *H01M 2004/021* (2013.01); *H01M 2004/027* (2013.01)

(58) Field of Classification Search
CPC .. B21B 1/40; B21B 3/00; B21B 27/06; B21B 27/10; B21B 45/0239; B21B 45/0242; B21B 45/0248; B21B 45/0251; B21B 45/0266; C10M 105/76; C10M 171/005; C10M 2227/04; C10M 2227/045; C10M 107/50; H01M 4/0435; H01M 4/1395; H01M 4/382; H01M 4/405; H01M 2004/021; H01M 2004/027; C10N 2240/40; C10N 2240/402; C10N 2240/406; C10N 2240/407; Y10T 29/49112; Y10T 29/49114; Y10T 29/49115
USPC ............................................... 72/41–46, 236
See application file for complete search history.

(56) References Cited

U.S. PATENT DOCUMENTS

| 4,138,349 | A | * | 2/1979 | Brown, Jr. | ........... C10M 169/04 508/206 |
|---|---|---|---|---|---|
| 5,528,920 | A | * | 6/1996 | Bouchard | ................. B21B 3/00 72/205 |
| 5,837,401 | A | * | 11/1998 | Gauthier | ............. B21B 45/0242 252/62.2 |
| 6,019,801 | A | * | 2/2000 | Gauthier | ............. B21B 45/0242 29/623.3 |
| 7,513,136 | B2 | * | 4/2009 | Laliberte | ................... B21B 3/00 72/11.4 |
| 2015/0299609 | A1 | * | 10/2015 | Stammer | ............ C10M 169/042 508/208 |

* cited by examiner

*Primary Examiner* — Peter DungBa Vo
*Assistant Examiner* — Joshua D Anderson
(74) *Attorney, Agent, or Firm* — McMillan LLP

(57) ABSTRACT

A volatile methyl siloxane lubricant for use in the process of laminating lithium sheets into lithium films is disclosed.

2 Claims, 1 Drawing Sheet

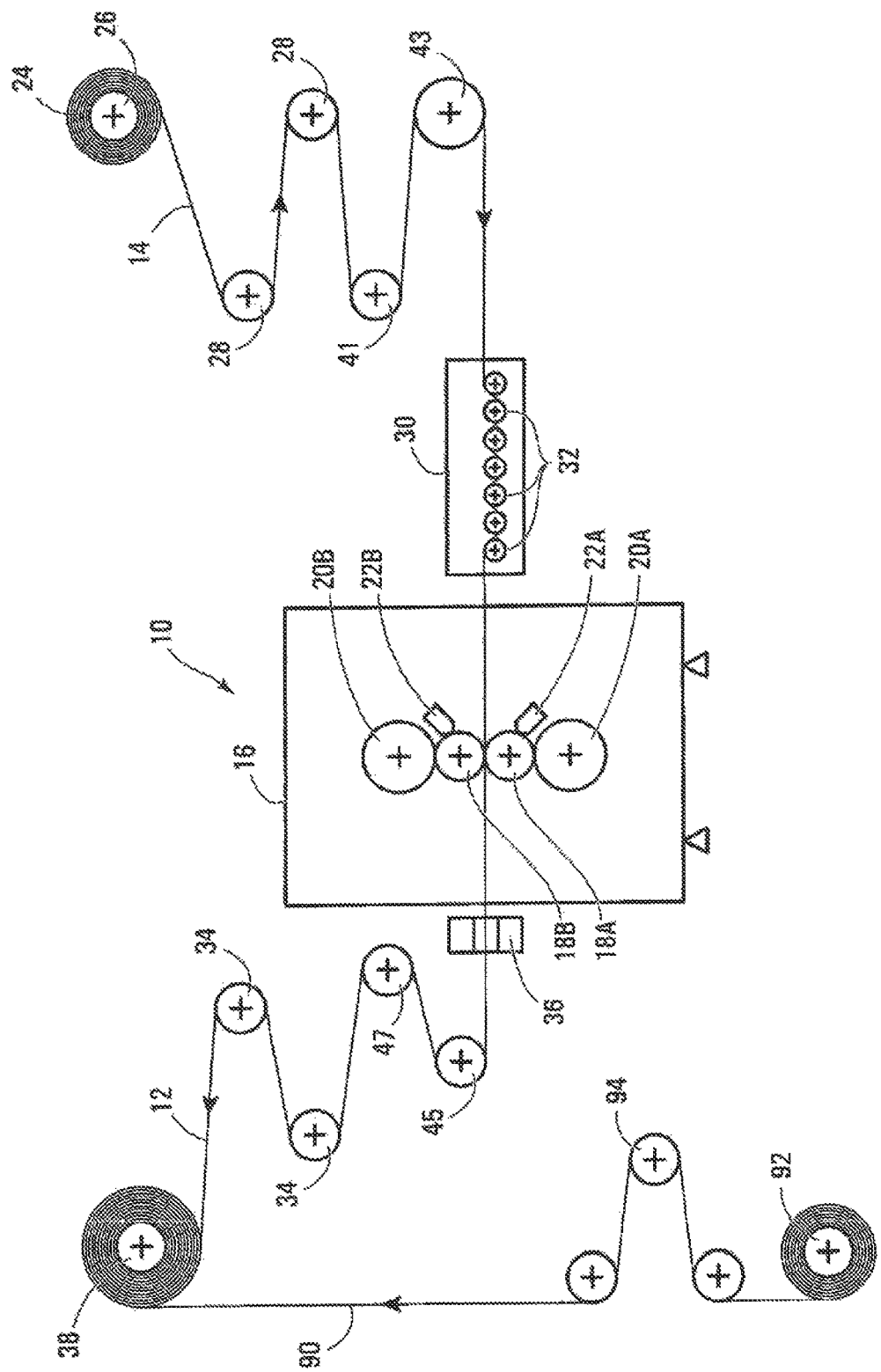

LUBRICANT FOR LAMINATION OF LITHIUM SHEETS INTO LITHIUM THIN FILMS

FIELD OF THE INVENTION

The present invention relates generally to a process of lamination of lithium sheets and more specifically to a lubricant composition for use in a process of laminating sheets of lithium metals or alloys thereof into thin films which may be used as anodes in electrochemical cells.

BACKGROUND OF THE INVENTION

Rechargeable Lithium polymer batteries manufactured from laminates of solid polymer electrolytes and thin film cathodes and thin film lithium metal anodes displays many advantages over conventional lithium-ion batteries using liquid electrolytes. These advantages include lower overall battery weight, high power density, high specific energy, longer service life, and environmentally friendly since the danger of spilling toxic liquid into the environment is eliminated. Lithium metal polymer batteries have become the most promising energy storage device for use in electric or hybrid vehicles and stationary applications such as back-up power systems, energy accumulators for solar panels or wind turbines energy productions and for peak shaving electric consumption in residential and industrial applications.

The production of thin films of lithium having a thickness lower than 100 micrometers ($\mu$m) and in the form of wide bands, for example 10 centimeters (cm) or more and in lengths of many hundreds of meters, by means of rapid and reliable processes, faces important technical difficulties which are attributable to the extreme physical and chemical properties of lithium metal such as its chemical reactivity, its malleability, its low mechanical strength, its rapid self-welding by simple contact and its strong adhesion to most solid materials, such as for example other more usual metals like steel, aluminium and their usual alloys.

Presently, cold extrusion is used for the continuous production of lithium or lithium alloy sheets of 150 to 250 $\mu$m as described in U.S. Pat. No. 6,854,312 which is herein incorporated by reference taking advantage of the malleability of lithium metal. For lower thicknesses, the films obtained by extrusion are thereafter laminated through a lamination apparatus as described in U.S. Pat. No. 7,513,136 which is also herein incorporated by reference comprising adjustable lamination rollers adapted to control the shape and profile of the lithium or lithium alloy film being laminated at to thicknesses of 100 $\mu$m or less which can be used in Lithium polymer batteries.

In the lamination process, a lubricating agent including a specific additive mixed with a solvent as described in U.S. Pat. No. 5,837,401 is used to prevent adhesion of the thin lithium film in contact with the lamination rollers under pressure in order to prevent breakage of the thin lithium film. The particular additive and solvent disclosed in U.S. Pat. No. 5,837,401 which is herein incorporated by reference have the specific property of being chemically compatible with lithium films for use in an electrochemical cell. The lubricating agent described in U.S. Pat. No. 5,837,401 prevents the laminated lithium film from excessively adhering to the lamination rollers and does not react with lithium through oxidation on the surface of the lithium films and therefore does not impair the electrochemical exchanges at the interface of the thin film lithium anode and the polymer electrolyte of the electrochemical cell when the latter is assembled and operated. The main advantage of the chemical formulation of this lubricating agent is that the specific additive may be kept at the surface of the lithium film after lamination and this without harming the good operation of the lithium anode when used as such in an electrochemical cell. In turn, the chemical compatibility of this lubricating agent toward lithium eliminates the step of washing the surfaces of the laminated lithium film prior to assembly and use in an electrochemical cell. Previous lamination lubricant including reactive organic functions, such as organic acids and alcohols used to laminate lithium sheets into lithium films for electrochemical cells had to be removed from the surfaces of the laminated lithium films because they were harmful for a good operation of electrochemical cells.

The preparation of the lubricating agent described in U.S. Pat. No. 5,837,401 is however cumbersome. The composition of the lubricating agent must contain precisely 0.2% by weight of polyoxyethylene distearate mixed with a solvent selected amongst heptane, benzene, toluene, cyclohexane or a mixture of these solvent. The mixture must be stirred for a few hours to properly blend all the components and must be stirred constantly when used as a lubricant agent when laminating lithium sheets into lithium films.

Furthermore, although the lubricant agent remaining on the surface of the lithium film does not hinder the good operation of the lithium anode when is used in an electrochemical cell, it does not contribute to its good operation. As such, remaining lubricant adds to the weight of the electrochemical cell and therefore reduces although marginally the specific energy density of the electrochemical cell produced.

The mixing and blending operation of the lubricating agent described above as well as the direct costs of components of the lubricant agent: the additive (polyoxyethylene distearate) and of the solvents (heptane, benzene, toluene and cyclohexane) increase the overall cost of the electrochemical cells manufactured with thin lithium films.

Thus, there is a need for a new lubricant for laminating lithium sheets into lithium films for electrochemical cells that does not remain on the surface of the lithium films after lamination and that requires less manipulation for its preparation.

SUMMARY OF THE INVENTION

It is an object of the present invention to ameliorate at least some of the inconveniences present in the prior art.

It is also an object of the present invention to provide a lubricant for use in the process of laminating lithium sheets into lithium films of 100 $\mu$m or less.

In one aspect, the invention provides a lubricant for use in the process of laminating lithium or lithium alloy sheets into lithium or lithium alloy films, the lubricant being a volatile methyl siloxane selected from the group of polydimethylsiloxane, hexamethyldisiloxane, octamethyltrisiloxane, decamethyltetrasiloxane and dodecamethylhexasiloxane.

In another aspect, the invention provides a method for laminating a lithium or lithium alloy sheet into a lithium or lithium alloy film comprising: feeding a lithium or lithium alloy sheet between a pair of working rollers and having applied onto the working rollers a volatile methyl siloxane lubricant in liquid form, the lithium or lithium alloy sheet upon compression between the working rollers being reduced in thickness by the compressive force exerted on the lithium or lithium alloy sheet as it passes through the working rollers to obtain a lithium or lithium alloy film of less than 100 $\mu$m.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 1 is a schematic side cross-sectional view of an apparatus for laminating a lithium or lithium alloy sheet into a thin film including lubricant dispensing units.

DETAILED DESCRIPTION OF THE PREFERRED EMBODIMENTS

With reference to FIG. 1, there is shown in schematic form a lamination apparatus 10 adapted to produce a lithium or lithium alloy thin film 12 of less than 100 μm, preferably less than 75 μm and more preferably about 50 μm from a previously extruded lithium or lithium alloy sheet 14 of about 150 to 250 μm. Lamination apparatus 10 comprises a main frame 16, a pair of lamination rollers 18a and 18b, a first back-up roller 20a adjacent and in contact with lamination roller 18a, a second back-up roller 20b adjacent and in contact with lamination roller 18b and two lamination lubricant dispensing units 22a and 22b. A roll 24 of wound extruded lithium or lithium alloy sheet 14 is placed on a feeding roller 26 comprising a drive motor control unit (not shown) adapted to control the tension of the lithium sheet 14 prior to reaching the lamination rollers 18a and 18b.

The lithium sheet 14 of about 150 to 250 μm snakes its way through a series of free rollers 28 leading to a first encoder roller 41 measuring the exact speed of the traveling lithium sheet 14, and to a first tension roller 43 equipped with a load cell adapted to precisely measure the tension on lithium sheet 14 entering the lamination apparatus 10. The load cell of tension roller 43 may be electronically coupled to the control unit of the drive motor of roll 24 to automatically adjust the tension exerted onto lithium sheet 14. Lithium sheet 14 is then fed into a straightener 30 which rapidly winds lithium sheet 14 through a series of tightly packed rollers 32 which has the effect of eliminating any lateral displacement of lithium sheet 14 and preventing any zigzagging motion of lithium sheet 14 thereby ensuring lithium sheet 14 is fed straight into the central portion of lamination rollers 18a and 18b without any lateral weaving motion that would be detrimental to the lamination process. Lithium sheet 14 is therefore fed into lamination rollers 18a and 18b at a fixed position between the rollers.

At the inlet of lamination apparatus 10, lubricant dispensing units 22a and 22b discharge an adequate amount of lamination lubricant compatible with lithium onto the working surfaces of each working roller 18a and 18b upstream from the lamination area such that the lithium sheet 14 is laminated with properly lubricated working rollers 18a and 18b thereby preventing undesirable adhesion of the laminated film 12 onto either working rollers.

As mentioned, the lubricant previously used on the surfaces of the working rollers 18a and 18b is described in U.S. Pat. Nos. 5,837,401 and 6,019,801 and is based on solvents selected from heptane, benzene, toluene, cyclohexane or a mixture thereof and a polyoxyethylene distereate. The drawbacks of this particular lubricant are multiple. First, as previously described some of the lubricant remains on the surfaces of the laminated lithium films and is therefore incorporated into the electrochemical cell. Secondly, the mixing and blending of the constituents of the lubricating agent requires hours and it is difficult to obtain a homogeneous mixture. Thirdly, the solvents used in the lubricant are pollutant which must be manipulated with care and controlled. And finally, the lubricant remaining on the working rollers must be cleaned off after each roll 24 of extruded lithium sheet 14 is laminated through the lamination apparatus 10.

The laminated lithium film 12 is pulled through an optical refractory system 36 which measures the evenness of the surface of the laminated lithium film 12 and also detects any porosity on the film and cracks along the edge of the film. An optical system can also be used to measure the thickness of lithium film 12. Controlled tension is applied onto the lithium film 12 by a driven winding roller 38 to ensure the laminated lithium film 12 is properly wound. The laminated lithium film 12 snakes its way under controlled tension through a series of rollers, the first of which is a second tension roller 45 equipped with a load cell adapted to precisely measure the tension on laminated lithium film 12 exiting the lamination apparatus 10. The load cell of tension roller 45 may be electronically coupled to the control unit of the drive motor of winding roller 38 to automatically adjust the tension exerted onto lithium sheet 12. The lithium film is then wound through a second encoder roller 47 measuring the exact speed of the traveling lithium film 12. The laminated lithium film 12 is then wound through a series of free rollers 34 leading to winding roller 38.

A thin film of insulating material such as a polypropylene film 90 is also wound around the winding roller 38 to separate the layers of lithium film 12 such that they will not adhere to each other. The insulating film 90 is pulled by winding roller 38 from a roll 92 but is first wound through a tension roller 94 equipped with a load cell adapted to precisely measure the tension on insulating film 90. This tension measurement is necessary to control the tension exerted by winding roller 38 onto lithium film 12 since the tension exerted by winding roller 38 is divided between the lithium film 12 and the insulating film 90.

The first and second encoder rollers 41 and 47 respectively measure the speed of the lithium sheet 14 entering the lamination apparatus 10 and the speed of the laminated lithium film 12 exiting the lamination apparatus 10. The relation between the inlet speed of the lithium sheet 14 and the outlet speed of the laminated lithium film 12 is directly proportional to the thickness reduction of the initial lithium sheet 14 into lithium film 12 such that the thickness of the laminated lithium film 12 may be deducted through a simple mathematical equation when the thickness of the initial lithium sheet 14 is known. The thickness of the laminated lithium film 12 is preferably controlled and verified through the speed differential between the first and second encoder rollers 41 and 47.

Through various experiments to replace the lubricant based on toluene, hexane and a polyoxyethylene distereate, the inventors have discovered that volatile methyl siloxane of the family of polydimethysiloxane oligomers commonly known as silicone oils provided the ideal replacement lubricant for laminating lithium sheets into lithium films of less than 100 μm. Silicone oils are typically used as releasing agents for moulded rubber parts and as lubricant for plastic and rubber surfaces. The low viscosity-index of silicone oils, their thermal and chemical stability, their shear-breakdown resistance, their compressibility as well as their volatility make silicone oils outstanding as lubricant for laminating lithium sheets into lithium films. Silicone oils are environmentally friendly as they are typically used in personal care products; they are easily recyclable; their volatility eliminates the residue of lubricant remaining on the surface of the laminated lithium film and also eliminates the need to clean the working rollers after lamination. Furthermore, silicone oils can be used as lubricant as mono-solvents in their pure form requiring no mixing or blending with other solvents. Finally their exceptionally low viscosity enable the use of 3 to 4.5 times less lubricant as compared to the polyoxyethylene distereate based lubricant of the prior art.

A methyl siloxane is a chemical compound composed of units of the form $(CH_3)_2SiO$. Methyl siloxanes can have branched or unbranched backbones consisting of alternating silicon and oxygen atoms (e.g., —Si—O—Si—O—), with side chains methyl groups attached to the silicon atoms. Preferred volatile methyl siloxanes include linear polydimethylsiloxane $(C_2H_6OSi)n$ such as Hexamethyldisiloxane $(C_6H_{18}OSi_2)$, Octamethyltrisiloxane $(C_8H_{24}O_2Si_3)$, Decamethyltetrasiloxane $(C_{10}H_{30}O_3Si_4)$ and Dodecamethylhexasiloxane $(C_{12}H_{36}O_6Si_6)$.

Tests were first conducted with hexamethyldisiloxane $(C_6H_{18}OSi_2)$ having a viscosity of 0.65 centistoke @25° C. Hexamethyldisiloxane is a clear, colorless and essentially odorless fluid. It is typically used as base fluid in a number of personal care products such as skin cream lotions, bath oils, suntan lotions, deodorants, hair sprays and other beauty and hair care products. As such, hexamethyldisiloxane is safe for manipulation. Hexamethyldisiloxane possesses the fastest evaporation rate of all silicone fluids, the lowest surface tension, the highest compressibility and high spreadability. These characteristics made it an excellent candidate as a lubricant for laminating lithium sheets into lithium films.

A layer of Hexamethyldisiloxane fluid was initially spread over the surface of a sample of lithium foil to determine if lithium would react with the Hexamethyldisiloxane fluid and to evaluate the evaporation rate of the Hexamethyldisiloxane fluid to determine if the Hexamethyldisiloxane fluid would completely evaporate and leave the surface of the lithium foil free of lubricant.

The lithium foil sample of 15 cm by 15 cm covered with the layer of Hexamethyldisiloxane fluid was put in a glove box having an anhydride atmosphere containing less than 1% relative humidity maintained at 21° C. and was allowed to dry for 5 minutes. After 5 minutes, the lithium foil sample is visually inspected. The visual aspect of the surface of the lithium foil is excellent; the lithium is bright without any coloring indicating that the lithium has not reacted with Hexamethyldisiloxane fluid. As well, the surface of the lithium foil is completely dry indicating that the Hexamethyldisiloxane has completely evaporated, leaving the surface of the lithium foil free of lubricant.

The Hexamethyldisiloxane fluid was then tested for its lubricating quality under the shear and compression stresses produced by the lamination apparatus 10 described in FIG. 1. The reservoir connected to the lubricant dispensing units 22a and 22b was filled with Hexamethyldisiloxane fluid. A roll 24 of previously extruded lithium sheet 14 having a thickness of 200 μm is installed on a feeding roller 26 and wound through the rollers 28, 41 and 43 and through the straightener 30 and fed into the working roller 18a and 18b. The setup is completed by winding the lithium sheet 14 through the optical refractory system 36 and through the rollers 45, 47 and 34 and securing the end of the lithium sheet to the winding roller 38 and installing the polypropylene film 90.

The working rollers 18a and 18b are adjusted to reduce the thickness of the extruded lithium sheet 14 from 200 μm to less than 100 μm. The lamination test run of the lithium sheet 14 is carried out an anhydride atmosphere containing less than 1% relative humidity with the Hexamethyldisiloxane lubricant fluid discharged onto the working surfaces of each working rollers 18a and 18b via the lubricant dispensing units 22a and 22b at the rate of 4.5 times less than the lubricant of the prior art.

The initial lamination test showed that the Hexamethyldisiloxane lubricant fluid was evaporating extremely fast once the temperature of the working rollers 18a and 18b rose after 30 seconds and this rapid evaporation left some portions of the surfaces of the working rollers 18a and 18b unlubricated and caused portions of the laminated film 12 to adhere partially to the working rollers 18a and 18b. To alleviate this rapid evaporation, the debit of lubricant of the dispensing units 22a and 22b was increased gradually from 4.5 times less than the lubricant of the prior art to 3.25 times less than the lubricant of the prior art at which point the surfaces of the working rollers 18a and 18b remained lubricated throughout and the laminated film 12 no longer adhered partially to the working rollers 18a and 18b.

The lamination test run was conclusive in that there was no undesirable adhesion of the laminated lithium film 12 onto the working rollers 18a and 18b with a lubricant debit of 3.25 times less than the lubricant of the prior art and the optical refractory system 36 measuring the evenness of the surface of the laminated lithium film 12 showed a smooth and even surface devoid of porosity or crack. The rolled up laminated lithium film 12 was analysed to determine if any Hexamethyldisiloxane remained on the surface of the laminated lithium film 12 and it was found completely dried indicating that the Hexamethyldisiloxane completely evaporated while the laminated lithium film 12 snaked its way through the rollers 45, 47 and 34 before being wound onto the winding roller 38.

The lamination test run demonstrated that the Hexamethyldisiloxane lubricant fluid has the necessary physical quality to provide adequate lubrication for laminating an extruded lithium sheet into a thin lithium film and furthermore the quantity of Hexamethyldisiloxane lubricant fluid required was 3.25 times less than the lubricant of the prior art. As well, the static test in the glove box demonstrated that the Hexamethyldisiloxane lubricant fluid has the necessary chemical quality for use with lithium as it showed no reaction with the surface of the lithium film.

Another test was conducted with Octamethyltrisiloxane $(C_8H_{24}O_2Si_3)$ having a viscosity of 1.0 centistoke @25° C. (viscosity of water). Octamethyltrisiloxane is also a clear, colorless and essentially odorless fluid. It is also typically used as base fluid in a number of personal care products because of excellent spreading and high evaporation characteristics As such, Octamethyltrisiloxane is safe for manipulation. Octamethyltrisiloxane possesses a high rate of evaporation, a low VTC (viscosity change with temperature), low surface tension, high compressibility and high spreadability. These characteristics also make it an excellent candidate as a lubricant for laminating lithium sheets into lithium films.

A layer of Octamethyltrisiloxane fluid was initially spread over the surface of a sample of lithium foil to determine if lithium would react with the Octamethyltrisiloxane fluid and to evaluate the evaporation rate of the Octamethyltrisiloxane fluid to determine if the Octamethyltrisiloxane fluid would completely evaporate and leave the surface of the lithium foil free of lubricant.

The lithium foil sample of 15 cm by 15 cm covered with the layer of Octamethyltrisiloxane fluid was put in a glove box having an anhydride atmosphere containing less than 1% relative humidity maintained at 21° C. and was allowed to dry for 5 minutes. After 5 minutes, the lithium foil sample is visually inspected. The visual aspect of the surface of the lithium foil is excellent; the lithium is bright without any coloring indicating that the lithium has not reacted with Octamethyltrisiloxane fluid. As well, the surface of the lithium foil is completely dry indicating that the Octamethyltrisiloxane has completely evaporated, leaving the surface of the lithium foil free of lubricant.

The Octamethyltrisiloxane fluid was then tested for its lubricating quality under the shear and compression stresses produced by the lamination apparatus 10 described in FIG. 1 in the same way as previously described with reference to Hexamethyldisiloxane fluid. The reservoir connected to the lubricant dispensing units 22a and 22b was filled with Octamethyltrisiloxane fluid. A roll 24 of previously extruded lithium sheet 14 having a thickness of 200 μm is installed on a feeding roller 26 and wound through the rollers 28, 41 and 43 and through the straightener 30 and fed into the working roller 18a and 18b. The setup is completed by winding the lithium sheet 14 through the optical refractory system 36 and through the rollers 45, 47 and 34 and securing the end of the lithium sheet to the winding roller 38 and installing the polypropylene film 90.

The working rollers 18a and 18b are adjusted to reduce the thickness of the extruded lithium sheet 14 from 200 μm to less than 100 μm. The lamination test run of the lithium sheet 14 is carried out an anhydride atmosphere containing less than 1% relative humidity with the Octamethyltrisiloxane lubricant fluid discharged onto the working surfaces of each working rollers 18a and 18b via the lubricant dispensing units 22a and 22b at the rate 4.5 times less than the lubricant of the prior art.

The initial lamination test showed that the Octamethyltrisiloxane lubricant fluid was also evaporating too fast once the temperature of the working rollers 18a and 18b had risen after 30 seconds and this rapid evaporation left some portions of the surfaces of the working rollers 18a and 18b unlubricated and caused portions of the laminated film 12 to adhere partially to the working rollers 18a and 18b. To alleviate this fast evaporation, the debit of lubricant of the dispensing units 22a and 22b was increased gradually from 4.5 times less to 3.5 times less than the lubricant of the prior art at which point the surfaces of the working rollers 18a and 18b remained lubricated throughout and the laminated film 12 no longer adhered partially to the working rollers 18a and 18b.

The lamination test run was conclusive in that there was no undesirable adhesion of the laminated lithium film 12 onto the working rollers 18 a and 18b with a lubricant debit of 3.5 times less than the lubricant of the prior art and the optical refractory system 36 measuring the evenness of the surface of the laminated lithium film 12 showed a smooth and even surface devoid of porosity or crack. The rolled up laminated lithium film 12 was analysed to determine if any Octamethyltrisiloxane remained on the surface of the laminated lithium film 12 and it was found completely dried indicating that the Octamethyltrisiloxane completely evaporated while the laminated lithium film 12 snaked its way through the rollers 45, 47 and 34 before being wound onto the winding roller 38.

The lamination test run demonstrated that the Octamethyltrisiloxane lubricant fluid has the necessary physical quality to provide adequate lubrication for laminating an extruded lithium sheet into a thin lithium film and furthermore the quantity of Octamethyltrisiloxane lubricant fluid required was 3.5 times less than the lubricant of the prior art. As well, the static test in the glove box demonstrated that the Octamethyltrisiloxane lubricant fluid has the necessary chemical quality for use with lithium as it showed no reaction with the surface of the lithium film.

A new test was conducted with Decamethyltetrasiloxane $(C_{10}H_{30}O_3Si_4)$ having a viscosity of 1.5 centistoke @25° C. Decamethyltetrasiloxane is also a clear, colorless and odorless fluid. It is also typically used as base fluid in a number of personal care products due to its excellent spreading and high volatility characteristics such as antiperspirant, deodorants, skin care lotions, suntan lotions, and cosmetics in general. As such, Decamethyltetrasiloxane is safe for manipulation. Decamethyltetrasiloxane possesses a fast rate of evaporation, excellent low temperature stability, a low VTC (viscosity change with temperature), low surface tension, high compressibility and high spreadability. These characteristics also make it an excellent candidate as a lubricant for laminating lithium sheets into lithium films.

A layer of Decamethyltetrasiloxane fluid was initially spread over the surface of a sample of lithium foil to determine if lithium would react with the Decamethyltetrasiloxane fluid and to evaluate the evaporation rate of the Decamethyltetrasiloxane fluid to determine if the Decamethyltetrasiloxane fluid would completely evaporate and leave the surface of the lithium foil free of lubricant.

The lithium foil sample of 15 cm by 15 cm covered with the layer of Decamethyltetrasiloxane fluid was put in a glove box having an anhydride atmosphere containing less than 1% relative humidity maintained at 21° C. and was allowed to dry for 5 minutes. After 5 minutes, the lithium foil sample is visually inspected. The visual aspect of the surface of the lithium foil is excellent; the lithium is bright without any coloring indicating that the lithium has not reacted with Decamethyltetrasiloxane fluid. As well, the surface of the lithium foil is completely dry indicating that the Decamethyltetrasiloxane has completely evaporated, leaving the surface of the lithium foil free of lubricant.

The Decamethyltetrasiloxane fluid was then tested for its lubricating quality under the shear and compression stresses produced by the lamination apparatus 10 described in FIG. 1 in the same way as previously described with reference to Hexamethyldisiloxane and Octamethyltrisiloxane fluids. The reservoir connected to the lubricant dispensing units 22a and 22b was filled with Decamethyltetrasiloxane fluid. A roll 24 of previously extruded lithium sheet 14 having a thickness of 200 μm is installed on a feeding roller 26 and wound through the rollers 28, 41 and 43 and through the straightener 30 and fed into the working roller 18a and 18b. The setup is completed by winding the lithium sheet 14 through the optical refractory system 36 and through the rollers 45, 47 and 34 and securing the end of the lithium sheet to the winding roller 38 and installing the polypropylene film 90.

The working rollers 18a and 18b are adjusted to reduce the thickness of the extruded lithium sheet 14 from 200 μm to less than 100 μm. The lamination test run of the lithium sheet 14 is carried out an anhydride atmosphere containing less than 1% relative humidity with the Decamethyltetrasiloxane lubricant fluid discharged onto the working surfaces of each working rollers 18*a* and 18*b* via the lubricant dispensing units 22*a* and 22*b* at the rate of 4.5 times less than the lubricant of the prior art.

The lamination test run was conclusive at the rate of 4.5 times less than the lubricant of the prior art in that there was no undesirable adhesion of the laminated lithium film 12 onto the working rollers 18*a* and 18*b* and the optical refractory system 36 measuring the evenness of the surface of the laminated lithium film 12 showed a smooth and even surface devoid of porosity or crack. The rolled up laminated lithium film 12 was analysed to determine if any Decamethyltetrasiloxane remained on the surface of the laminated lithium film 12 and it was found completely dried indicating that the Decamethyltetrasiloxane completely evaporated while the laminated lithium film 12 snaked its way through the rollers 45, 47 and 34 before being wound onto the winding roller 38.

The lamination test run demonstrated that the Decamethyltetrasiloxane lubricant fluid has the necessary physical quality to provide adequate lubrication for laminating an extruded lithium sheet into a thin lithium film and furthermore the quantity of Decamethyltetrasiloxane lubricant fluid required was 4.5 times less than the lubricant of the prior art. As well, the static test in the glove box demonstrated that the Decamethyltetrasiloxane lubricant fluid has the necessary chemical quality for use with lithium as it showed no reaction with the surface of the lithium film.

A further test was conducted with Dodecamethylhexasiloxane ($C_{12}H_{36}O_6Si_6$) having a viscosity of 2.0 centistoke @25° C. Dodecamethylhexasiloxane is also a clear, colorless and odorless fluid. It is also typically used as base fluid in a number of personal care products due to its excellent spreading and high volatility characteristics such as antiperspirant, deodorants, skin care lotions, suntan lotions, and cosmetics in general. As such, Dodecamethylhexasiloxane is safe for manipulation. Dodecamethylhexasiloxane possesses a fast rate of evaporation, a low VTC (viscosity change with temperature), low surface tension, high compressibility and high spreadability. These characteristics also make it an excellent candidate as a lubricant for laminating lithium sheets into lithium films.

A layer of Dodecamethylhexasiloxane fluid was initially spread over the surface of a sample of lithium foil to determine if lithium would react with the Dodecamethylhexasiloxane fluid and to evaluate the evaporation rate of the Dodecamethylhexasiloxane fluid to determine if the Dodecamethylhexasiloxane fluid would completely evaporate and leave the surface of the lithium foil free of lubricant.

The lithium foil sample of 15 cm by 15 cm covered with the layer of Dodecamethylhexasiloxane fluid was put in a glove box having an anhydride atmosphere containing less than 1% relative humidity maintained at 21° C. and was allowed to dry for 5 minutes. After 5 minutes, the lithium foil sample is visually inspected. The visual aspect of the surface of the lithium foil is excellent; the lithium is bright without any coloring indicating that the lithium has not reacted with Dodecamethylhexasiloxane fluid. As well, the surface of the lithium foil is completely dry indicating that the Dodecamethylhexasiloxane has completely evaporated, leaving the surface of the lithium foil free of lubricant.

The Dodecamethylhexasiloxane fluid was then tested for its lubricating quality under the shear and compression stresses produced by the lamination apparatus 10 described in FIG. 1 in the same way as previously described with reference to Hexamethyldisiloxane, Octamethyltrisiloxane and Decamethyltetrasiloxane fluids. The reservoir connected to the lubricant dispensing units 22*a* and 22*b* was filled with Dodecamethylhexasiloxane fluid. A roll 24 of previously extruded lithium sheet 14 having a thickness of 200 μm is installed on a feeding roller 26 and wound through the rollers 28, 41 and 43 and through the straightener 30 and fed into the working roller 18*a* and 18*b*. The setup is completed by winding the lithium sheet 14 through the optical refractory system 36 and through the rollers 45, 47 and 34 and securing the end of the lithium sheet to the winding roller 38 and installing the polypropylene film 90.

The working rollers 18*a* and 18*b* are adjusted to reduce the thickness of the extruded lithium sheet 14 from 200 μm to less than 100 μm. The lamination test run of the lithium sheet 14 is carried out an anhydride atmosphere containing less than 1% relative humidity with the Dodecamethylhexasiloxane lubricant fluid discharged onto the working surfaces of each working rollers 18*a* and 18*b* via the lubricant dispensing units 22*a* and 22*b* at the rate of 4.5 times less than the lubricant of the prior art.

The lamination test run was conclusive at the rate of 4.5 times less than the lubricant of the prior art in that there was no undesirable adhesion of the laminated lithium film 12 onto the working rollers 18*a* and 18*b* and the optical refractory system 36 measuring the evenness of the surface of the laminated lithium film 12 showed a smooth and even surface devoid of porosity or crack. The rolled up laminated lithium film 12 was analysed to determine if any Dodecamethylhexasiloxane remained on the surface of the laminated lithium film 12 and it was found completely dried indicating that the Dodecamethylhexasiloxane completely evaporated while the laminated lithium film 12 snaked its way through the rollers 45, 47 and 34 before being wound onto the winding roller 38.

The lamination test run demonstrated that the Dodecamethylhexasiloxane lubricant fluid has the necessary physical quality to provide adequate lubrication for laminating an extruded lithium sheet into a thin lithium film and furthermore the quantity of Dodecamethylhexasiloxane lubricant fluid required was 4.5 times less than the lubricant of the prior art. As well, the static test in the glove box demonstrated that the Dodecamethylhexasiloxane lubricant fluid has the necessary chemical quality for use with lithium as it showed no reaction with the surface of the lithium film.

Lab cells were prepared with a sample of each lithium film laminated as described above used as an anode of the lab cells. Each lab cell was prepared with a lithium film having a thickness of less than 100 μm laminated with one of the volatile methyl siloxane lubricants, a polymer electrolyte consisting of a copolymer of ethylene oxide and methylglycidyl ether and a lithium salt, and a composite cathode consisting of carbonated lithiated iron phosphate (C—$LiFePO_4$) and the same polymer electrolyte. The initial impedance of the lab cells at 60° C. are equivalent to an identical lab cell having a lithium anode having a thickness of less than 100 μm laminated with the lubricating agent of the prior art consisting of a mixture of solvents and polyoxyethylene distearate.

The cycling properties of these lab cells utilizing as an anode the lithium films laminated with the volatile methyl siloxane lubricants described above are excellent after 100 cycles and the rate of utilization of the lab cells remains equivalent to similar lab cells prepared with lithium films laminated with the lubricating agent of the prior art. The lab cell tests confirm that the lithium films laminated with one of the volatile methyl siloxane as lubricant described above performs as well as lithium films laminated with the lubricating agent of the prior art.

Thin lithium films or foils are used primarily in the field of batteries but also find applications in the fields of electronics, medical pacemakers, the aerospace industry and specialized scientific devices such as neutron detectors.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A method for laminating a lithium or lithium alloy sheet into a lithium or lithium alloy film comprising:
    feeding a lithium or lithium alloy sheet between a pair of working rollers and having applied onto the working rollers a volatile methyl siloxane lubricant in liquid form, the lithium or lithium alloy sheet upon compression between the working rollers being reduced in thickness by the compressive force exerted on the lithium or lithium alloy sheet as it passes through the working rollers to obtain a lithium or lithium alloy film of less than 100 μm, wherein the volatile methyl siloxane lubricant is used as a mono-solvent in its pure form without mixing or blending with other solvents.

2. The method as defined in claim 1, wherein the volatile methyl siloxane lubricant is selected from the group of polydimethylsiloxane, hexamethyldisiloxane, octamethyltrisiloxane, decamethyltetrasiloxane and dodecamethylhexasiloxane.

* * * * *